United States Patent [19]

Giardini

[11] 4,027,630

[45] June 7, 1977

[54] VAPOR INJECTION APPARATUS FOR AN INTERNAL COMBUSTION ENGINE

[75] Inventor: Dante S. Giardini, Dearborn Heights, Mich.

[73] Assignee: Ford Motor Company, Dearborn, Mich.

[22] Filed: Mar. 22, 1976

[21] Appl. No.: 669,428

[52] U.S. Cl. .......................... 123/25 P; 123/25 N
[51] Int. Cl.² ........................... F02M 25/02
[58] Field of Search ............ 123/25 R, 25 A, 25 B, 123/25 D, 25 P, 25 L, 25 M, 25 N, 26; 261/18 A

[56] References Cited

UNITED STATES PATENTS

| | | | |
|---|---|---|---|
| 1,611,530 | 12/1926 | Ludia .................... | 123/25 D |
| 2,403,774 | 7/1946 | Whitty et al. ............ | 123/25 A |
| 2,444,670 | 7/1948 | Porter .................... | 123/25 B |
| 2,702,027 | 2/1955 | Drydyke ................ | 123/25 D |
| 2,796,852 | 6/1957 | Schumacher .......... | 123/25 B |
| 3,044,453 | 7/1962 | Hoffmann .............. | 123/25 B |
| 3,528,225 | 9/1970 | Manfredi ................ | 123/25 R X |
| 3,842,808 | 10/1974 | Cataldo .................. | 123/25 R X |
| 3,866,579 | 2/1975 | Serruys .................. | 123/25 R X |

*Primary Examiner*—C. J. Husar
*Assistant Examiner*—Ira S. Lazarus
*Attorney, Agent, or Firm*—John J. Roethel; Keith L. Zerschling

[57] ABSTRACT

Apparatus for supplying an air-vapor mixture to an air intake chamber in communication with an air intake passageway of a carburetor under acceleration conditions of an internal combustion engine. The air intake chamber has a valved inlet opening through which normal atmospheric air is supplied to the carburetor under normal operating conditions. Upon operation of the accelerator control means, a steam or vapor operated air injection means is actuated. The steam or vapor is admixed in the air injector nozzles with the mixture being discharged into the air intake chamber. This increases the pressure in the chamber causing the valve in the atmospheric air inlet to close. The air-vapor mixture then becomes the sole air supply to the air intake passage of the carburetor.

10 Claims, 2 Drawing Figures

VAPOR INJECTION APPARATUS FOR AN INTERNAL COMBUSTION ENGINE

BACKGROUND OF THE INVENTION

It has long been recognized that the injection of vapor into the carburetor of an internal combustion engine improves the efficiency and performance of the engine especially when acceleration is demanded. The liquid to be vaporized frequently is an aqueous solution of methonal alcohol.

Representative prior art patents disclosing vapor injection apparatus include U.S. Pat. No. 2,889,819 issued June 9, 1959 to A. H. Lockhead for a "Fuel Mixer for Automobile Engines," U.S. Pat. No. 3,322,105 issued May 30, 1967 to A. McIntyre for "Equipment for Augmenting the Fuel Supplied to Internal Combustion Engines" and U.S. Pat. No. 3,557,763 issued Jan. 26, 1971 to S. C. Probst for "Vapor injector."

U.S. Pat. No. 3,557,763 discloses an apparatus in which the vapor is delivered to the engine intake manifold where it is mixed with the air-fuel mixture from the carburetor inlet passage. This is a continual process. U.S. Pat. No. 3,322,105 discloses an apparatus in which the liquid to be vaporized is pulled from a tank by engine vacuum and on the way to the carburetor is mixed with air from the air cleaner. This also is a continual process. The system disclosed in U.S. Pat. No. 2,889,819 is controlled by the speed of the engine fan and is a continuous process for mixing liquid to be vaporized with air at speeds above idling speed.

It is an object of the present invention to provide an apparatus that becomes operative only at a predetermined position of the accelerator control means such as occurs when immediate acceleration is desired.

SUMMARY OF THE INVENTION

The present invention relates to a vapor injection apparatus for controlling the vapor content of air supplied to a carburetor of an internal combustion engine. The apparatus comprises a housing having an air intake chamber in communication with an air intake passageway of a carburetor. A valve means on the housing is operative to permit the flow of atmospheric air into the air intake chamber when the air pressure within the chamber is lower than the air pressure internally of the housing. An air injector is coupled to the housing in communication with the chamber. A steam generator is coupled to the air injector. The steam generator is also coupled to a pump which is operative to pump liquid to be vaporized into the steam generator in response to movement of an accelerator control into a predetermined engine acceleration position. The flow of vapor from the steam generator through the air injector causes aspiration of air into the air injector and admixing of the air and steam for discharge into the housing chamber. The air-vapor mixture discharged into the housing chamber raises the pressure within the chamber and causes the valve means to close the chamber to the admittance of atmospheric air whereby the air-vapor mixture becomes the sole air supply to the air intake passage of the carburetor.

DESCRIPTION OF THE DRAWINGS

Further features and advantages of the present invention will be made more apparent as this description proceeds, reference being had to the accompany drawings, wherein.

DETAILED DESCRIPTION OF THE INVENTION

Figure 1:
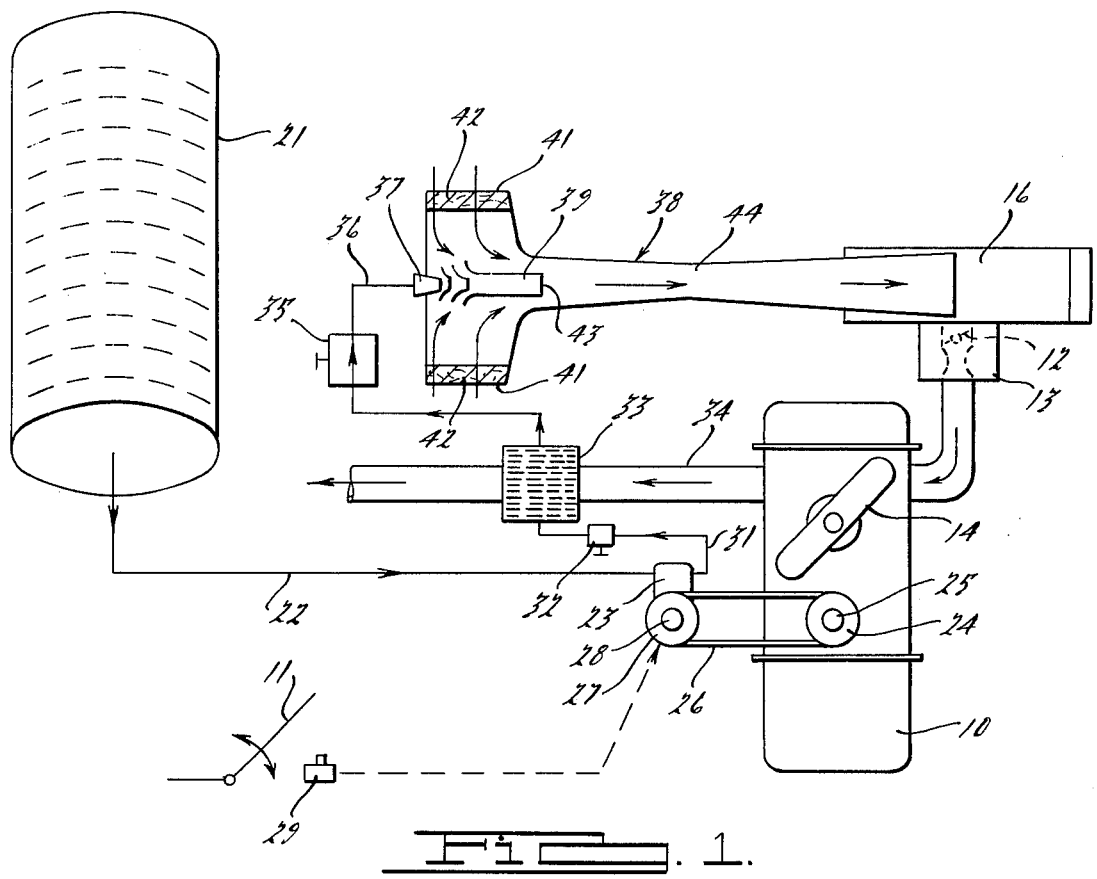
FIG. 1 is a schematic view of the vapor injection apparatus embodying the present invention.
Figure 2:
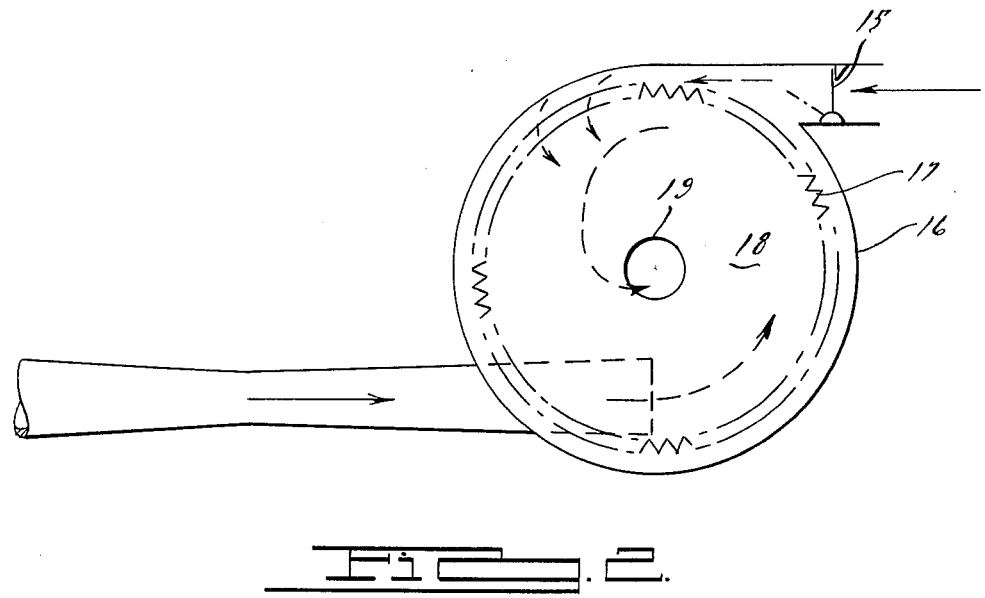
FIG. 2 is an enlarged diagrammatic plan view of the carburetor air intake filter housing.

Referring now to the drawing, under normal operation of the engine, schematically shown at 10, the accelerator pedal 11 controls the engine speed by actuation of the throttle valve 12 at the carburetor 13. Engine aspiration and the normal ram air from the engine 14 and forward movement of the vehicle forces spring-loaded valve 15 to open supplying air through the air filter 17 into the filter housing chamber 18 in communication with carburetor air intake passageway 19.

When immediate engine acceleration is desired, the vapor injection apparatus embodying the present invention is called into play. The apparatus or system comprises a reservoir or tank 21 which is connected by a suitable pipe line 22 to the inlet side of a pump 23. The pump 23 is driven from a pulley 24 mounted on a power take-off shaft 25 on the engine 10. The pulley 24 is connected by a drive belt 26 to an electromagnetic clutch pulley 27 which in de-energized condition free wheels on the shaft 28 of the pump 23. The electromagnetic clutch is energized by the closing of a switch 29, the switch being actuated by engagement by the accelerator pedal when the latter is fully depressed in a full acceleration mode.

Upon operation of the pump the latter pumps liquid from the reservoir 21 into an outlet line 31 through a pressure regulator 32 into a heat exchanger or steam generator 33. The steam generator is heated by a continuous flow of exhaust gas flowing through an exhaust pipe 34 from the engine exhaust manifold.

Liquid from the pump 23 when pumped into the steam generator 33 flashes into vapor or steam because of the preheated heat exchanger elements and because of the continuous flow of exhaust gases flowing through the generator. When the steam or vapor pressure in the generator 33 reaches a pressure above the preset pressure of a second regulator 35, the steam or vapor flows into a line 36 leading to a primary jet 37 of an air ejector assembly 38. Preferably, the pressure regulator 32 is pre-set at a pressure 100 p.s.i. higher than the second regulator 35 to ensure that the flow of vapor or steam will be away from the pump 23.

The steam or vapor flow through the primary jet 37 aspirates air into a secondary nozzle 39 of the air ejector assembly 38.

The air ejector assembly 38 is shown as having air inlets 41 protected by suitable air filter devices 42. The secondary nozzle 39 is shown as a three stage nozzle.

As the vapor or steam flow enters the secondary nozzle 39, air from the filters 42 is aspirated into the three stages of the secondary nozzle and is admixed with the expanding jet stream. This mixture of steam or vapor and air continues at higher capacity and lower velocity out of outlet 43 of the secondary nozzle 39 into the throat 44 of the ejector assembly 38.

The latter condition aspirates additional air through the filters 41 into the jet assembly 38. Compressed air from the jet assembly is discharged into the filter housing chamber 18. Since this steam or vapor and air mixture is at a pressure higher than atmospheric pressure, the spring-loaded valve 15 closes against a valve stop 45. Thus, only steam or vapor-air mixture is fed into the carburetor during the acceleration phase.

As soon as the acceleration pressure on the accelerator is released, the switch 29 opens and the pump 23 is deactuated. With the supply of fluid to the steam generator cut-off, the latter quickly runs dry and the supply of steam or vapor to the air jet assembly runs out. The pressure within the air filter housing drops below atmospheric causing the valve 15 to open permitting the flow of atmospheric air into the air filter housing to be restored.

The steam generator 33 is preferably an aluminum titanium honey comb structure having a large mass of heat insulated aluminum that serves as a heat sink for storing exhaust gas b.t.u.'s at low engine speeds when the exhaust gas flow is lowest.

The reservoir 12 is preferably filled with at 50% alcohol and water mixture although the dilution may vary to whatever may be required for peak engine acceleration with good emission characteristics.

Two of the major advantages of the system disclosed are that it permits the use of smaller horsepower engines capable of obtaining desired acceleration and provides improved engine operation during acceleration particularly with respect to reducing oxides of nitrogen emissions.

It is to be understood this invention is not limited to the exact constructions illustrated and described above, but that various changes and modifications may be made without departing from the spirit and scope of the invention as defined by the following claims:

I claim:

1. Vapor injection apparatus for controlling the vapor content of air supplied to a carburetor of an internal combustion engine, comprising:
   a housing having an air intake chamber in communication with an air intake passageway of a carburetor,
   valve means on the housing operative to permit flow of atmospheric air into the air intake chamber when the air pressure within the chamber is lower than the air pressure externally of the housing,
   air injector means coupled to the housing in communication with the chamber,
   steam generating means coupled to the air injector means,
   and pump means for pumping liquid to be vaporized in the steam generating means in response to movement of an accelerator control means into a predetermined engine acceleration position,
   the flow of vapor from the steam generating means through the air injector means causing aspiration of air into the air injector means and admixing of the air and steam for discharge into the housing chamber,
   the air-vapor mixture raising the pressure within the chamber causing the valve means to close the chamber to the admittance of atmospheric air through the valve means whereby the air-vapor mixture becomes the sole air supply to the air intake passage of the carburetor.

2. Vapor injection apparatus according to claim 1, in which:
   the steam generating means comprises a heat exchanger receiving heat from an exhaust gas conduit of the internal combustion engine.

3. Vapor injection apparatus according to claim 2, in which:
   the pump means comprises a pump coupled to an electro-clutch means having its driving member coupled to a power shaft of the internal combustion engine,
   and an electric circuit including switch means for controlling energization of the electric-clutch means,
   the clutch means becoming operative to drive the pump upon the accelerator control means being moved into contact with the switch means for closing the clutch energizing electric circuit.

4. Vapor injection apparatus according to claim 3, in which:
   the steam generating means includes pressure regulators controlling the pressure of the fluid entering the heat exchanger and the pressure of the vapor being discharged therefrom,
   the pressure regulator on the heat exchanger fluid input side being set at a substantially higher level than that on the vapor output side.

5. Vapor injection apparatus according to claim 4, in which:
   the housing having the air intake chamber in communication with the carburetor air intake passageway contains an air filter for filtering air to the carburetor.

6. Vapor injection apparatus for controlling the vapor content of air supplied to a carburetor of an internal combustion engine comprising:
   an air filter housing having a chamber in communication with an air intake passageway of a carburetor,
   first and second air inlet openings into the air filter housing,
   the first air inlet opening having a valve means therein operative to permit flow of atmospheric air into the housing chamber when the air pressure within the chamber is lower than the air pressure externally of the housing,
   the second air inlet opening being coupled to an air injector means,
   a steam generator having a discharge outlet in communication with a primary jet of the air injector means,
   the flow of steam through the primary jet aspirating air into a secondary nozzle of the air injector means wherein the expanding steam and air are admixed and fed into the discharge throat of the air injector means,
   the air-steam mixture being compressed and dumped into the filter housing and raising the pressure therein causing the valve means in the first air inlet opening to close whereupon only air-steam mixture is fed into the carburetor air intake passageway,
   and pump means for pumping liquid to be vaporized into the steam generator upon actuation of a pump control means in response to movement of an engine acceleration control means into a predetermined engine acceleration position.

7. Vapor injection apparatus according to claim 6, in which:
   the steam generator comprises a heat exchanger receiving heat from an exhaust conduit of the internal combustion engine and fluid to be vaporized from a reservoir.

8. Vapor injection apparatus according to claim 7, in which:
   the pump means comprises a pump coupled to an electro-clutch means having its driving member coupled to a power shaft of the internal combustion engine, and an electric circuit including switch means for controlling energization of the electro-clutch means, the clutch means becoming operative to drive the pump upon the acceleration control means being moved into contact with the switch means for closing the clutch energizing circuit.

9. Vapor injection apparatus according to claim 8, in which:

pressure regulators control the pressure of the fluid entering the heat exchanger and the steam being discharged therefrom, the pressure regulator on the liquid input side being set at a substantially higher level than that on the steam output side.

10. Vapor injection apparatus according to claim 6, in which:

the pump means comprises a pump coupled to an electro-clutch means having a driving member coupled to a power shaft of the internal combustion engine, and an electric circuit including switch means for controlling energization of the electro-clutch means, the clutch means becoming operative to drive the pump upon the acceleratus control means being moved into contact with the switch means for closing the clutch energizing circuit.

* * * * *